(12) United States Patent
Xu (10) Patent No.: US 8,090,718 B2
(45) Date of Patent: Jan. 3, 2012

(54) METHODS AND APPARATUS FOR IMPROVING BACKWARD SEEK PERFORMANCE FOR MULTIMEDIA FILES

(75) Inventor: Weimin Xu, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 704 days.

(21) Appl. No.: 12/105,115

(22) Filed: Apr. 17, 2008

(65) Prior Publication Data

US 2009/0265384 A1 Oct. 22, 2009

(51) Int. Cl.
*G06F 7/00* (2006.01)
*G06F 17/30* (2006.01)

(52) U.S. Cl. ......................... 707/736; 707/913

(58) Field of Classification Search .................. None
See application file for complete search history.

(56) References Cited

U.S. PATENT DOCUMENTS

| | | | |
|---|---|---|---|
| 5,630,005 A | 5/1997 | Ort | |
| 5,802,242 A | 9/1998 | Kawamura et al. | |
| 6,005,624 A | 12/1999 | Vainsencher | |
| 6,249,551 B1 | 6/2001 | Yamaguchi | |
| 2003/0002194 A1* | 1/2003 | Andoh | 360/69 |
| 2003/0016939 A1* | 1/2003 | Yun | 386/5 |
| 2004/0098748 A1* | 5/2004 | Bo et al. | 725/105 |
| 2004/0208135 A1 | 10/2004 | Nakamura et al. | |
| 2005/0166012 A1* | 7/2005 | Liu et al. | 711/112 |

OTHER PUBLICATIONS

Li, Weiping, "Overview of Fine Granularity Scalability in MPEG-4 Video Standard," IEEE Transactions on Circuits and Systems for Video Technology, vol. 11, No. 3, Mar. 2001.*

"File Chaining and FAT Cluster Allocation", http://www.storagereview.com/guide2000/ref/hdd/file/clustChaining.html, Nov. 30, 2007.
Paul Stoffregan, "Understanding FAT32 Filesystems", http://www.pjrc.com/tech/8051/ide/fat32.html, Nov. 30, 2007.
"File Allocation Tables", http://storageview.com/guide2000/ref/hdd/file/fatFATs.html, Nov. 30, 2007.
Definition of "File Allocation Table", http://en.wikipedia.org/wiki/File_Allocation_Table, Oct. 31, 2007.
Definition of "MPEG-4", http://en.wikipedia.org/wiki/MPEG-4, Oct. 31, 2007.
Jan Willem, "MPEG-4 the Multi Media Format of the Future?", www.cdfreaks.com/reviews/MPEG-4-the-multi-media-format-of-the-future, Jan. 4, 2003.
Definition of "DuplicateHandle Function", http://msdn2.microsoft.com/en-us/library/ms724251(printer).aspx, Nov. 30, 2007, Microsoft Corporation.

(Continued)

*Primary Examiner* — Pierre Vital
*Assistant Examiner* — Rachel J Lee
(74) *Attorney, Agent, or Firm* — John J. Oskorep, Esq.

(57) ABSTRACT

A multimedia player application is adapted to process multimedia data of one or more multimedia files (e.g. MPEG-4 files) to produce multimedia output data at an audio/video output device. A file allocation table (FAT) system is adapted to manage storage of these multimedia files. An interface process is adapted to maintain a current address pointer for a current position in a multimedia file being played, a backward seek address pointer for a preceding position in the multimedia file between the current position and the beginning of the multimedia file, and an index table address pointer for an index table of the multimedia file. The current and backward seek address pointers are regularly updated while the multimedia file is being played, and the backward seek address pointer is updated as a function of the current address pointer. Advantageously, backward seek times for backward seeks in the multimedia file are reduced.

31 Claims, 6 Drawing Sheets

OTHER PUBLICATIONS

Definition of "MPEG transport stream", http://en.wikipedia.org/wiki/Transport_stream, Oct. 31, 2007.

Definition of "MPEG-4 Part 14", http://en.wikipedia.org/wiki/MPEG-4_Part_14, Oct. 31, 2007.

Scott Baker and John H. Hartman, "The Gecko NFS Web Proxy", http://entland.homelinux.com/blog/2006/10/25/reading-files-as-fas-as-possible, May 1999.

eSOL Products Selected for the New Game Console "Wii" from Nintendo, http://www.esol.co.jp/english/company/press/emb_press070404.html, Apr. 4, 2007.

James De Santos, "EntBlog—Code, 3D, Games, Linux and much more", http://entland.homelinux.com/blog/2006/10/25/reading-files-as-fas-as-possible, Oct. 25, 2006.

* cited by examiner

METHODS AND APPARATUS FOR IMPROVING BACKWARD SEEK PERFORMANCE FOR MULTIMEDIA FILES

BACKGROUND

1. Field of the Technology

The present disclosure relates generally to methods and apparatus for improving backward seek performance for multimedia files, and more particularly to improving the backward seek performance for combined audio and video files (e.g. MPEG-4 or "MP4" files) which are managed by a file allocation table (FAT) system.

2. Description of the Related Art

Some multimedia files, such as Moving Pictures Experts Group (MPEG) 4 or "MP4" files, contain compressed data of different types (e.g. combined audio and video data) which are stored in an interleaved or otherwise scattered, non-consecutive fashion. A file allocation table (FAT) system employing a "single-link" table, which is especially suitable when conservation of memory is important (e.g. memory in a small portable electronic device), may be utilized to manage and access data in such multimedia file.

Poor (i.e. slow) performance has been observed for a backwards seek of data during play of such multimedia file, as a search from the beginning of the multimedia file must be performed in order to get the correction position. This performance worsens as the file size and the current position of play increases.

Accordingly, there is a need for overcoming these and other deficiencies of the prior ail.

BRIEF DESCRIPTION OF THE DRAWINGS

Embodiments of present disclosure will now be described by way of example with reference to attached FIGS., wherein.

DETAILED DESCRIPTION OF THE PREFERRED EMBODIMENTS

In accordance with the present disclosure, a multimedia player application is adapted to process multimedia data of one or more multimedia files to produce multimedia output data at an audio/video output device. Each multimedia file is fragmented into a plurality of non-contiguous data blocks in memory. A file allocation table system is adapted to manage storage of these multimedia and maintain a file allocation table with address entries for listing the sequential order of the data blocks of the multimedia files. An interface process is adapted to maintain a current address pointer which corresponds to a current position in the multimedia file being played by the multimedia player application, and also maintain a backward seek address pointer which corresponds to a preceding position in the multimedia file between the current position and the beginning of the multimedia file. For each one of a plurality of multimedia data requests for multimedia data from the multimedia player application, the interface process is further adapted to receive a multimedia data request for multimedia data which includes a requested offset value to the requested multimedia data in the multimedia file; if the requested offset value corresponds to a position in the multimedia file that follows the current position: submit, to the file system, a corresponding data request for the requested multimedia data which includes the current address pointer and an offset value, and receive the requested multimedia data from the file system in response; if the requested offset value corresponds to a position in the multimedia file that precedes the current position: submit, to the file system, a corresponding data request for the requested multimedia data which includes the backward seek address pointer and an offset value, and receive the requested multimedia data from the file system in response; and submit the requested multimedia data to the multimedia player module in response to the multimedia data request. The current and backward seek address pointers are regularly updated while the multimedia file is being played, and the backward seek address pointer is updated as a function of the current address pointer. Advantageously, backward seek times for backward seeks in the multimedia file are reduced.

Figure 1:
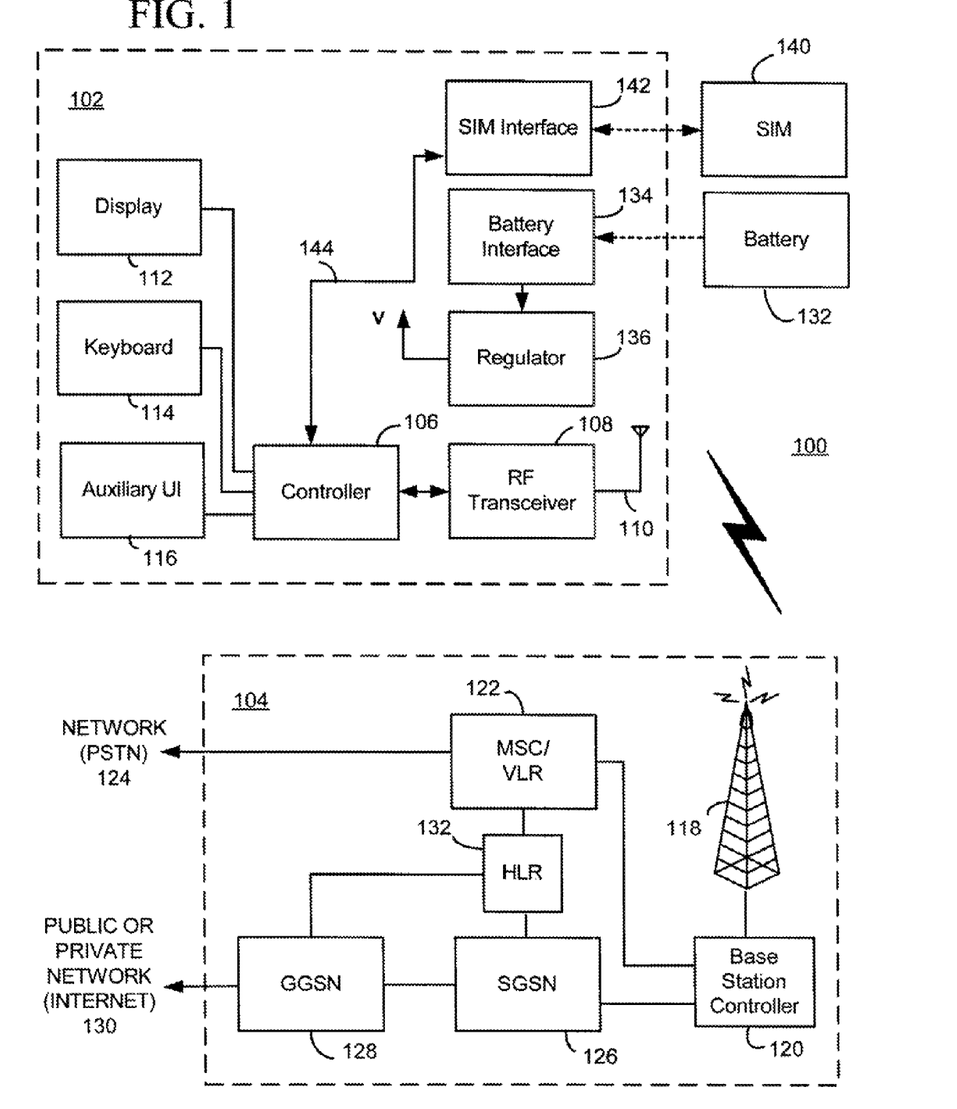
FIG. 1 is a block diagram illustrating pertinent components of one type of portable electronic device which may employ the present techniques, namely, a mobile communication device adapted to operate in a wireless communication network.

To illustrate an exemplary environment within which the present techniques may be utilized, FIG. 1 is a block diagram of a communication system 100 which includes a mobile communication device 102 which communicates through a wireless communication network 104. In the embodiment of FIG. 1, wireless communication network 104 is configured in accordance with Global Systems for Mobile (GSM) and General Packet Radio Service (GPRS) technologies; however, any suitable type of network communication protocols may be utilized. For example, the network may be based on code division multiple access (CDMA) or other suitable technologies. As another example, the network may be based on an Integrated Dispatch Enhanced Network (iDEN) which is a high-capacity digital trunked radio system providing integrated voice and data services. On the other hand, mobile communication device 102 may alternatively be a portable electronic device which does not provide any wireless communication capabilities through any wireless network (e.g. an audio/video (A/V) player, a PDA, etc.).

Mobile communication device 102 may include a visual display 112, a keyboard 114, and perhaps one or more auxiliary user interfaces (UI) 116, each of which are coupled to a controller 106. Controller 106 is also coupled to RF transceiver circuitry 108 and an antenna 110. Typically, controller 106 is embodied as a central processing unit (CPU) which runs operating system software in a memory component (not shown). Controller 106 will normally control overall operation of mobile communication device 102, whereas signal processing operations associated with communication functions are typically performed in RF transceiver circuitry 108.

Controller 106 interfaces with device display 112 to display received information, stored information, user inputs, and the like. Keyboard 114, which may be a telephone type keypad or full alphanumeric keyboard, is normally provided for entering data for storage in mobile communication device 102, information for transmission to wireless communication network 104, a telephone number to place a telephone call, commands to be executed on mobile communication device 102, and possibly other or different user inputs. Finally, controller 106 may embody all or part of the functionality of a multimedia system as described later in relation to FIGS. 4-7, where keyboard 114 and/or display 112 (which may be a touch screen display) are utilized for user interface processing.

Mobile communication device 102 sends communication signals to and receives communication signals from wireless communication network 104 over a wireless link via antenna 110. RF transceiver circuitry 108 performs functions similar to those of base station 118 and base station controller 120, including for example modulation/demodulation and possibly encoding/decoding and encryption/decryption. It is also contemplated that RF transceiver circuitry 108 may perform certain functions in addition to those performed by base station controller 120. It will be apparent to those skilled in art that RF transceiver circuitry 108 will be adapted to particular wireless communication network or networks in which mobile communication device 102 is intended to operate.

Being small (e.g. handheld in size) and portable in nature, mobile communication device 102 includes a battery interface 134 for receiving one or more rechargeable batteries 132. Battery 132 provides electrical power to electrical circuitry in mobile communication device 102, and battery interface 134 provides for a mechanical and electrical connection for battery 132. Battery interface 134 is coupled to a regulator 136 which regulates power to the device. When mobile communication device 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile communication device 102 operates using a Subscriber Identity Module (SIM) 140 which is connected to or inserted in mobile communication device 102 at a SIM interface 142. SIM 140 is used to identify a user (or subscriber) of mobile communication device 102 and to personalize the device, among other things. Without SIM 140, the mobile terminal is not fully operational for communication through wireless communication network 104. By inserting SIM 140 into mobile communication device 102, a user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that users are not necessarily bound by any single physical mobile communication device. SIM 140 may store additional user information for the mobile communication device as well, including datebook (or calendar) information and recent call information. Preferably, mobile communication device 102 includes an alternative or additional memory card and memory card interface (e.g. for a Secure Digital or "SD" card) which may store one or more multimedia files of a multimedia system, as will be described later in relation to FIG. 4.

Mobile communication device 102 may be embodied as and/or referred to as a single unit, such as a data communication device, a cellular telephone, a multiple-function communication device with data and voice communication capabilities, a personal digital assistant (PDA), an audio/video (A/V) player, or a computer incorporating an internal modem. Alternatively, mobile communication device 102 may be a multiple-module unit comprising a plurality of separate components, including but in no way limited to a computer or other device connected to a wireless modem. In particular, for example, in the block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile communication device 102 may have a more particular implementation as described later in relation to mobile station 202 of FIG. 2.

Mobile communication device 102 communicates in and through wireless communication network 104. In the embodiment of FIG. 1, wireless communication network 104 is configured in accordance with GSM and GPRS technologies. Wireless communication network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a transceiver station, and station 118 and BSC 120 are together referred to herein as the transceiver equipment. This fixed transceiver equipment provides wireless communication network coverage for a particular coverage area commonly referred to as a "cell". The transceiver equipment transmits communication signals to and receives communication signals from mobile devices within its cell via station 118. The transceiver equipment normally performs such functions as modulation and possibly encoding and/or encryption of signals to be transmitted to the mobile communication device in accordance with particular, usually predetermined, communication protocols and parameters, under control of its controller. The transceiver equipment similarly demodulates and possibly decodes and decrypts, if necessary, any communication signals received from mobile communication device 102 within its cell. Communication protocols and parameters may vary between different networks. For example, one network may employ a different modulation scheme and operate at different frequencies than other networks.

For all mobile devices registered with a network operator, permanent data (such as mobile communication device 102 user's profile) as well as temporary data (such as the mobile device's current location) are stored in HLR 132. In case of a voice call to mobile communication device 102, HLR 132 is queried to determine the current location of mobile communication device 102. A Visitor Location Register (VLR) of MSC 122 is responsible for a group of location areas and stores the data of those mobile communication devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile communication devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile communication device 102 or by the fixed transceiver equipment instructing mobile communication device 102 to select a particular cell. Mobile communication device 102 informs wireless communication network 104 when it reselects another cell or group of cells, known as a routing area.

In order to access GPRS services, mobile communication device 102 first makes its presence known to wireless communication network 104 by performing what is known as a GPRS "attach". This operation establishes a logical link between mobile communication device 102 and SGSN 126 and makes mobile communication device 102 available to receive, for example, pages via SGSN, notifications of incoming data, or SMS messages over GPRS. In order to send and receive GPRS data, mobile communication device 102 assists in activating the packet data address that it wants to use. This operation makes mobile communication device 102 known to GGSN 128; interworking with external data networks can thereafter commence. User data may be transferred transparently between mobile communication device 102 and the external data networks using, for example, encapsulation and tunneling. Data packets are equipped with GPRS-specific protocol information and transferred between mobile communication device 102 and GGSN 128.

Note that mobile communication device 102 may receive one or more multimedia files via wireless communication network 102 in a file format, or as multimedia data in a streaming format as requested.

Figure 2:
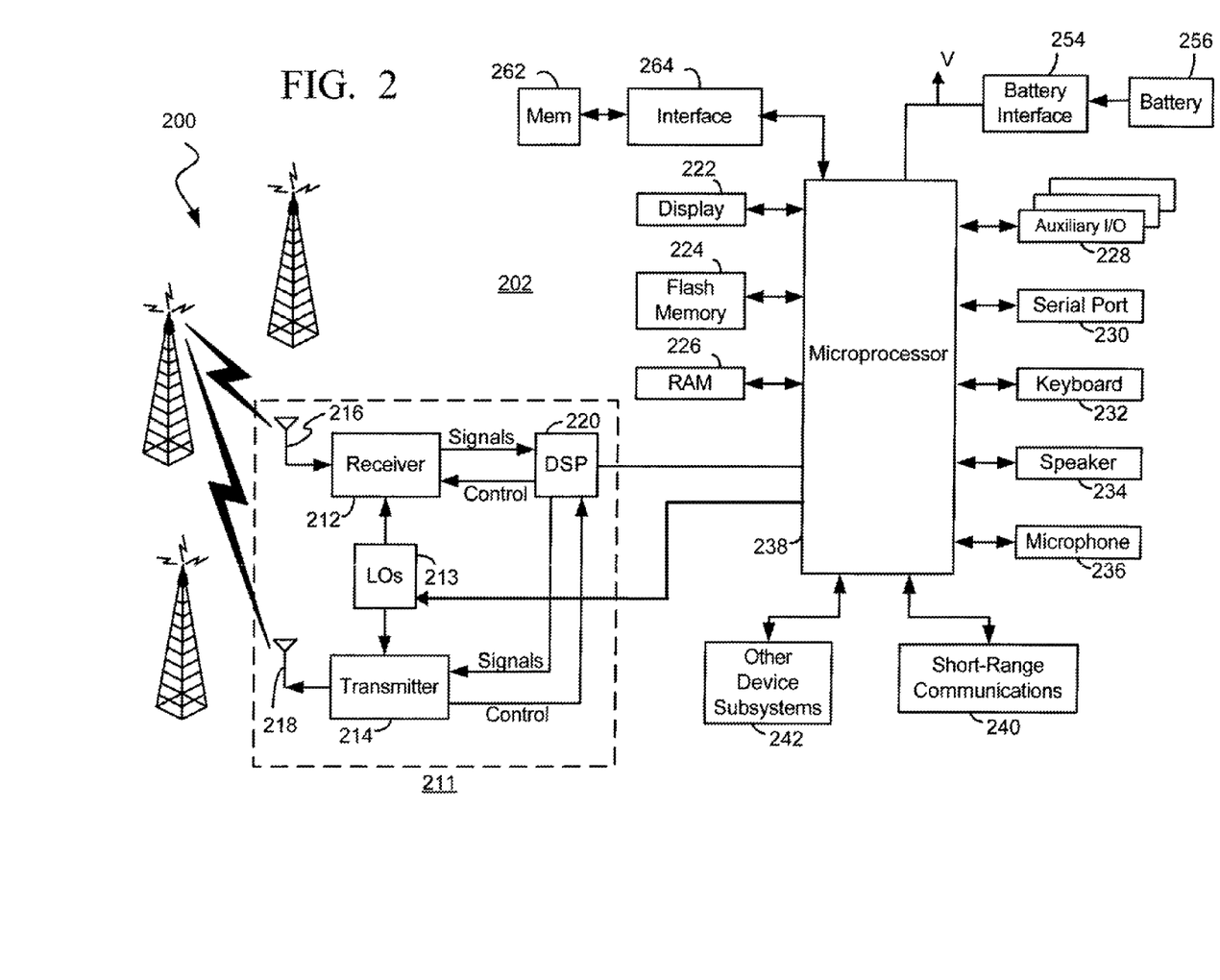
FIG. 2 is a more detailed diagram of the mobile communication device of FIG. 1.

FIG. 2 is a more detailed block diagram of the mobile communication device of FIG. 1, namely a mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a batter 256 provides electrical power to most if not all electrical circuitry in mobile station 202, and battery interface 254 provides for a mechanical and electrical connection for it. The battery interface 254 is coupled to a regulator (not shown) which provides a regulated voltage "V" to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Flash memory 224 may also store one or more multimedia files. Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. This also includes the software for executing the multimedia processing techniques of the present disclosure. More particularly, microprocessor 238 may embody all or part of the functionality of a multimedia system as described later in relation to FIGS. 4-7, where the keyboard and/or display (which may be a touch screen display) are utilized for user interface processing.

A preferred application which is loaded onto mobile station 202 may be a personal information manager (PIM) application having the ability to organize and manage data items relating to e-mail messages and voicemail messages, as well as calendar data. Naturally, one or more memory stores are available on mobile station 202 and SIM 262 to facilitate storage of PIM data items and other information. The PIM application preferably has the ability to send and receive data items via the wireless communication network. PIM data items may be seamlessly integrated, synchronized, and updated via the wireless communication network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238.

In a data communication mode, a received signal such as a text message (e.g. a short message service or SMS message), an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
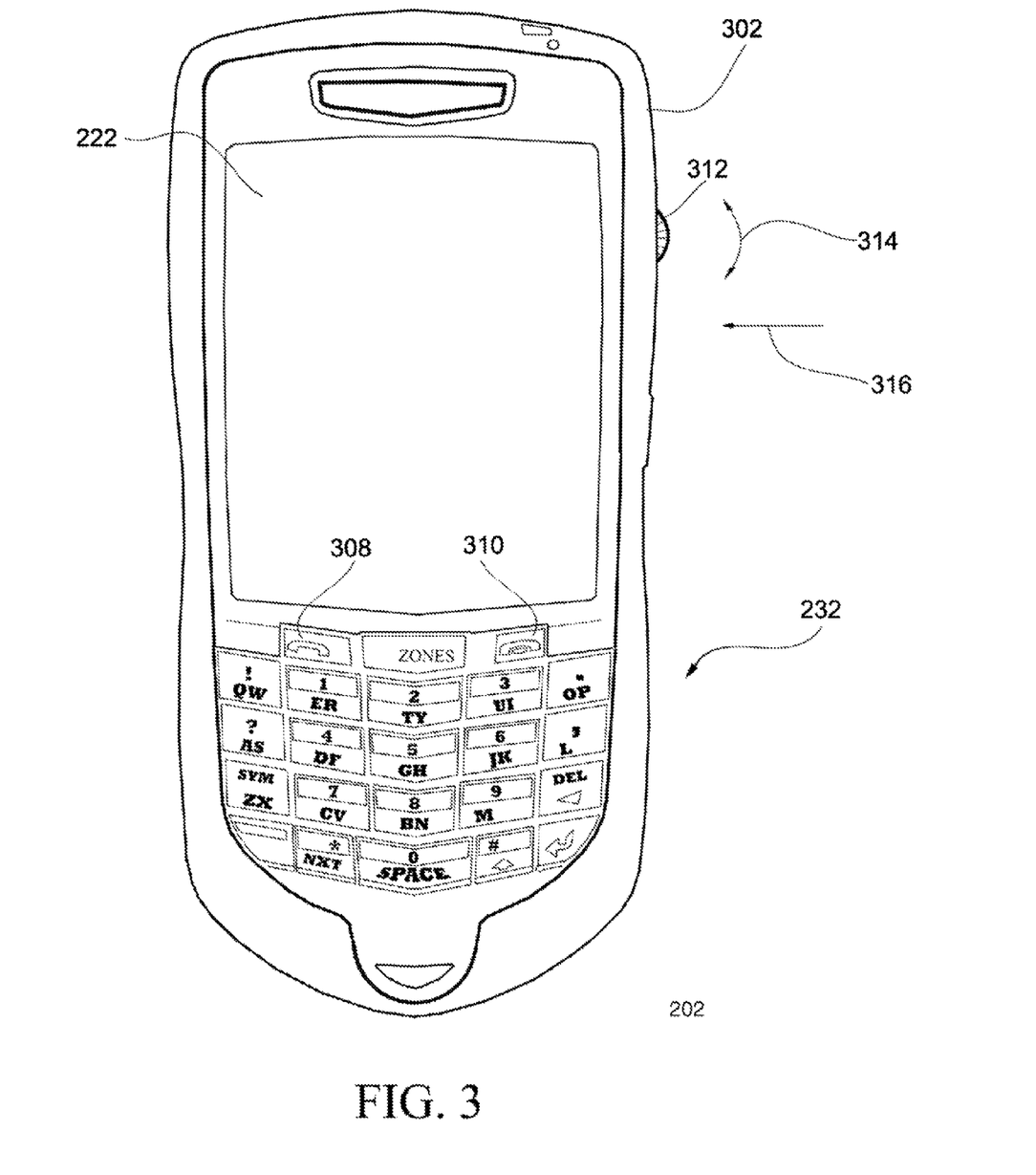
FIG. 3 is a front side view of the mobile communication device of FIGS. 1 and 2, showing a user interface which includes a visual display for displaying video imagery of a multimedia file, a speaker for producing audio signals of the multimedia file, and a plurality of keys for selecting and controlling the playing of the multimedia file.

FIG. 3 is a visual illustration of a front side of mobile station 202 of FIG. 2. Mobile station 202 of FIG. 3 has a housing 302 which contains the electronic circuitry and components shown and described in relation to FIGS. 1-2. Housing 302 of mobile station 202 carries a user interface having visual display 222 and keypad 232 with a plurality of keys as earlier described in relation to FIG. 2. With respect to multimedia files, visual display 222 is used to display video signals and imagery, and the speaker (not visible but behind the earpiece of housing 302) is used to produce audio signals.

As shown in FIG. 3, the plurality of keys of keypad 232 include a plurality of telephone digit keys (0, 1, 2, 3, 4, 5, 6, 7, 8, 9, *, and #) as well as control keys including a SEND key 308 (having a telephone handset icon inscribed thereon) and an END key 310 (having a telephone handset hang-up icon inscribed thereon). SEND and END keys 308 and 310 are mechanical switches of the mobile station which are detectable at switch inputs of the mobile station, as are the others. In general, SEND key 308 is used by the user for initiating a telephone call from mobile station 202 through the wireless communication network, and END key 310 is used by the user for terminating the telephone call. SEND and END keys 308 and 310 are carried and exposed on a front side of housing 302. Note that SEND and END keys 308 and 310, as well as any other keys, may alternatively be visual objects which are displayed in visual display 222 and detectable to the touch if visual display 222 is a touch screen display or other similar input device.

Mobile station 202 of FIG. 3 also includes an object viewing/selection mechanism for use with visual display 222. When mobile station 202 includes a multimedia system (e.g. FIGS. 4-7), the object viewing/selection mechanism (as well as other additional or alternative keys, buttons, or objects) may utilized to provide user input requests to the multimedia player module. In the present embodiment, the object viewing/selection mechanism of mobile station 202 is a scroll wheel 312. Scroll wheel 312 is positioned on a right hand side of housing 302. Scroll wheel 312 generally includes a circular disc which is rotatable about a fixed axis of housing 302, and may be rotated by the user's index finger or thumb. See the directions indicated by a rotation arrow 314 of scrollwheel 312 shown in FIG. 3. When the information or message is being partially displayed, an upwards rotation of scrollwheel 312 causes an upwards scrolling such that visual display 222 presents viewing of an upper portion of the information or message. Similarly, a downwards rotation of scrollwheel 312 causes a downwards scrolling such that visual display 222 presents viewing of a lower portion of the information or message. In this embodiment, scrollwheel 312 is mounted along a fixed linear axis such that the user can depress scrollwheel 312 inwards toward housing 302 (e.g. with the user's index finger or thumb) for selection of information. See the directions indicated by an arrow 316 of scrollwheel 312 shown in FIG. 3. Such lateral movement inwards toward the housing is detectable by the processor of the mobile station as a switch input (actuation or depression of the scrollwheel key). Although scrollwheel 312 of FIG. 3 has been shown and described as one mechanism for use in viewing and selecting visually displayed objects or information, any suitable viewing/selection mechanism may be utilized for the present user interface techniques to be described, such as UP and DOWN keys, a mouse (trackball) and cursor mechanism, or a touch screen display mechanism.

Figure 4:
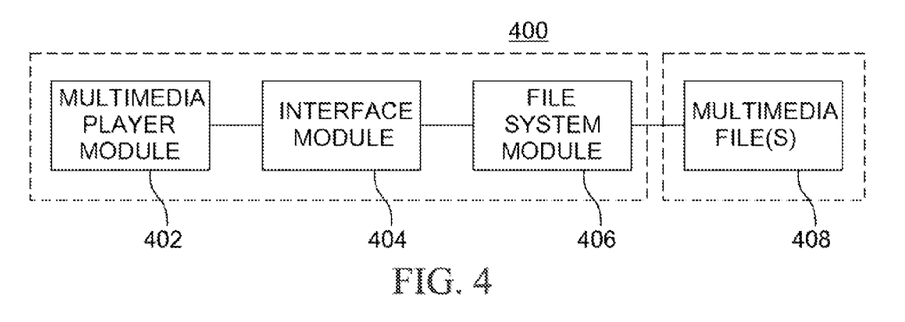
FIG. 4 is a block diagram of a multimedia system having a plurality of processing components which may be part of or included in the mobile communication device of FIGS. 1-3.

FIG. 4 is a block diagram of a multimedia system 400 having a plurality of processing components. These processing components may be part of a (portable) electronic device, such the mobile communication device of FIGS. 1-3. More particularly, multimedia player module 402, interface module 404, and file system module 406 may be software processing components embodied as computer instructions stored in memory or other computer readable medium and executable by one or more processors such as a microprocessor or the like. Each processing component may be separately provided as a computer program product, or together in any combination thereof. In FIG. 4, multimedia system 400 is shown to include a multimedia player module 402, an interface module 404, a file system module 406, and one or more electronic multimedia files 408 stored in memory. Note that communications between these components of multimedia system 400 may be through hard wired connections or via wireless channels (e.g. via the wireless network 104 of FIG. 1).

Each multimedia file 408 has compressed data of different types (e.g. combined audio and video data) which are stored in the memory in an interleaved or otherwise scattered, non-consecutive fashion. Each multimedia file 408 may be said to be fragmented into a plurality of non-contiguous data blocks in the memory. In this embodiment, each multimedia file is formatted in accordance with an MPEG-4 format or greater, (future) compatible version format. The memory which stores multimedia file 408 may be any suitable memory, such as flash memory (e.g. flash memory 224 of FIG. 2), and/or may be part of a removable memory card, such as a Secure Digital (SD) memory card, of the mobile communication device. Multimedia data from multimedia file 408 may be temporarily stored in a temporary memory, such as a random access memory (e.g. RAM 226 of FIG. 2) prior to processing. Note that the term "multimedia data" is meant as any data contained within multimedia file 408, whether video, audio, or index table or other information.

MPEG-4 is a collection of methods defining compression of audio and visual (AV) digital data. It was introduced in late 1998 and designated a standard for a group of audio and video coding formats and related technology agreed upon by the ISO/IEC Moving Picture Experts Group "MPEG" under the formal standard ISO/IEC 14496. Uses of MPEG-4 include compression of AV data for web (streaming media) and CD distribution, voice (telephone, videophone) and broadcast television applications. MPEG-4 actually consists of several standards, referred to as "parts", including Parts 1 through 23, for example. Profiles are also defined within the individual parts, and an implementation of any particular part is ordinarily not (or not necessarily) an implementation of an entire part.

File system module 406 manages the storage and access to data in multimedia file 408. File system module 406 has a file allocation table with address entries for listing a sequential order of the data blocks of the multimedia file 408. The file allocation table of file system module 406 may be a single-link or single-chain table, as opposed to a double-link or double-chain table which would require more memory space. File system module 406 may be, or be based upon, a file allocation table (FAT) system originally developed by Microsoft Corporation of Redmond, Wash., U.S.A. In one embodiment, file system module 406 may be or be compatible with "FAT16" which supports cluster or grouping counts in a 16-bit field.

Multimedia player module 400 is adapted to "play" the multimedia file 408, as well as facilitate the control over such playing, in response to user input requests via a user interface. The user input requests may be received via a graphical user interface (GUI) provided on a visual display (e.g. visual display 112/222 of FIGS. 1-3). The user input requests may correspond to standard media processing functions which include play, fast forward (or seek forward), rewind (or seek backward), pause, and stop, as examples. Multimedia player module 400 typically includes a multimedia file parser, an analyzer, and a decoder (decompressor). In response to any given user input request, multimedia player module 400 is adapted to submit a multimedia data request for data in multimedia file 408 which corresponds to the request. In response to the submitted multimedia data request, multimedia player module 400 receives compressed data (e.g. compressed video or audio data) from multimedia file 408 and decompresses and otherwise processes such data for producing the appropriate video or audio signals. When multimedia file 408 is being played, this processing is regular, repetitive, and continuous.

In the present embodiment, multimedia player module 400 is a component (e.g. a standard, "off-the-shelf" type component) which provides the multimedia data requests in accordance with a predetermined standard protocol or format. The multimedia data request of this predetermined standard protocol or format utilizes a requested position (e.g. a requested offset from the beginning of multimedia file 408) and a requested length (e.g. a requested number of bytes). In one example, multimedia player module 400 is or includes a Qtv™ decoder made available by Qualcomm Incorporated of San Diego, Calif., U.S.A.; Qtv™ is a trademark of Qualcomm Incorporated.

Interface module 404 is adapted to interface between multimedia player module 402 and file system module 404. Interface processing with use of interface module 404 is appropriate since multimedia player module 402 is not readily compatible to interface with file system module 404. Multimedia player module 402 is adapted to utilize the predetermined standard protocol or format for the multimedia data request (e.g. a requested offset from the beginning of multimedia file 408 and a requested number of bytes), whereas file system module 406 may also utilize its own predetermined standard protocol or format for data processing. For processing efficiency and enhanced performance, interface module 404 is adapted to utilize multiple address pointers and techniques as described in relation to FIGS. 6A-6C and 7.

Figure 5:
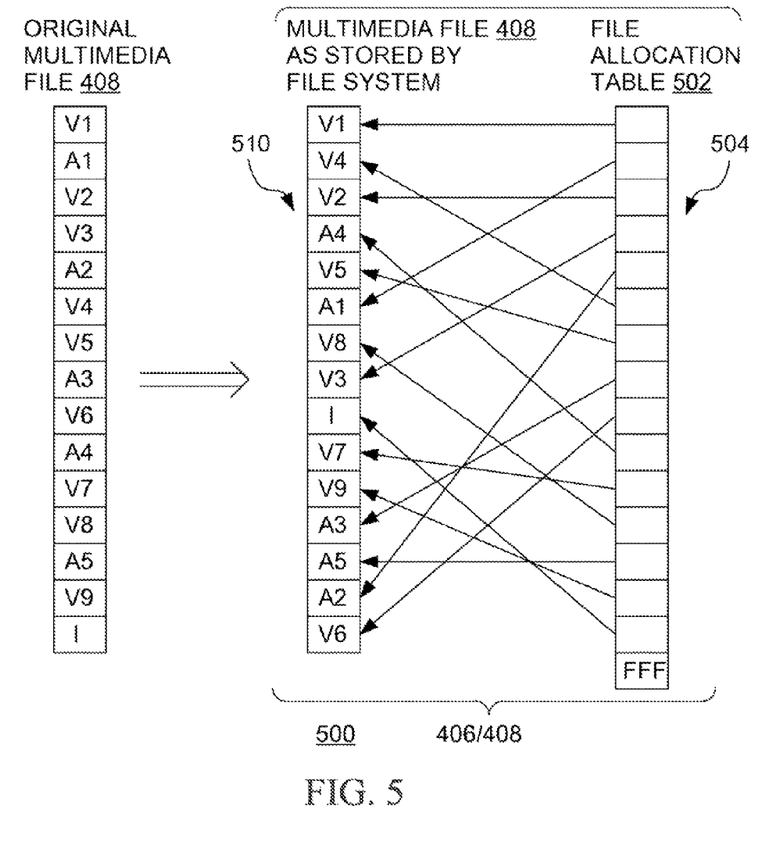
FIG. 5 is an illustrative depiction of data blocks of the multimedia file as stored in original form as well as in a file allocation table (FAT) system format which has a "single-chain" file allocation table.

FIG. 5 is an illustrative depiction of data blocks 500 of multimedia file 408 of FIG. 4, as stored in original form (far left in FIG. 5), as well as in a file allocation table (FAT) system format (middle of FIG. 5) for the FAT system module having a "single-chain" file allocation table 502 (far right in FIG. 5). The illustration of FIG. 5 has been provided to assist in the understanding of the relationships and complexities of the stored data involved, and does not necessarily illustrate the file and data blocks as configured in actual practice.

In FIG. 5, each video data block of multimedia file 408 is denoted with "V" followed by number and each audio data block of multimedia file 408 is denoted with a "A" followed by a number. An index table of multimedia file 408 is denoted as "I". As shown in its original format (i.e. far left in FIG. 5), multimedia file 408 has its compressed video and audio data in data blocks provided in the following order: V1, A1, V2, V3, A2, V4, V5, A3, V6, A4, V7, V8, A5, V9, and I in the order depicted. On the other hand, as shown as stored and managed by file system module 406 of FIG. 4 (middle of FIG. 5), the data blocks of multimedia file 408 are rearranged and provided in an alternative order: V1, V4, V2, A4, V5, A1, V8, V3, I, V7, V9, A3, A5, A2, and V6.

File allocation table 502 (i.e. far right in FIG. 5) is a "single-link" table which is utilized to manage and access data in multimedia file 408 for file system module 406 (FIG. 4). File allocation table 502 has a singly linked list of address entries for listing the proper sequential order of the data blocks of the multimedia file 408, as indicated by the arrows which point to the data blocks of multimedia file 408. The file system module is adapted to find requested multimedia data in response to a data request by examining each address in the file allocation table 502 starting from an address pointer (provided as part of or prior to the request) until the requested multimedia data is reached. Without use of any special techniques, when a backward seek of data is requested during play of multimedia file 408, a search from the beginning of the multimedia file needs to be performed through file allocation table 502 in order to get the correction position; this takes a long time, and the performance worsens as the file size and the current position of play increases.

Figure 6A:
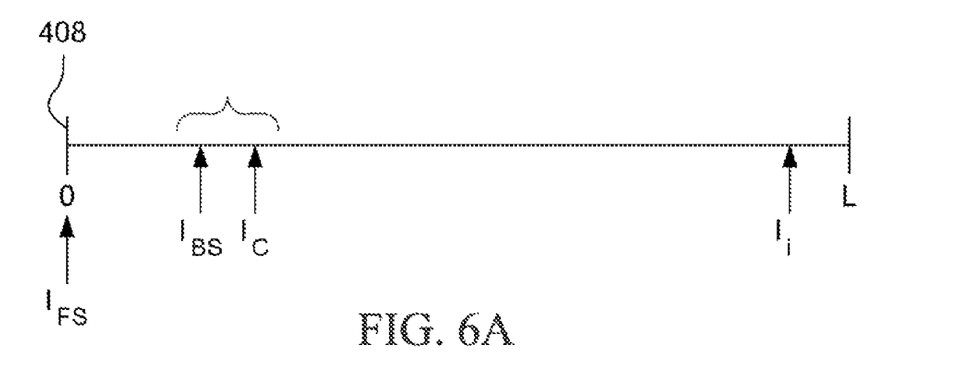
FIGS. 6A, 6B, and 6C are illustrative depictions of use of both one or more address pointers in accordance with techniques of the present disclosure.
Figure 6B:
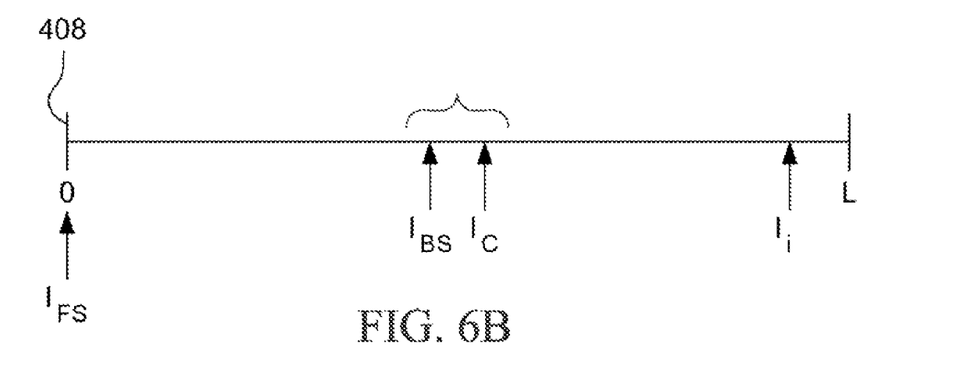
Figure 6C:
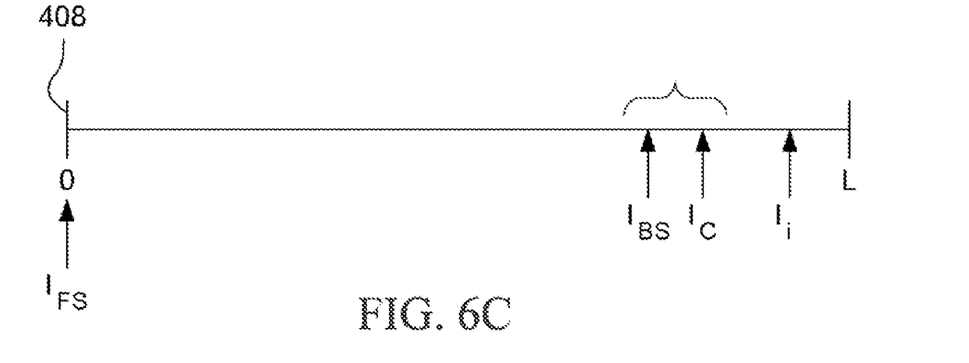

FIGS. 6A, 6B, and 6C are illustrative depictions associated with use of multiple address pointers for file positions in multimedia file 408 in accordance with techniques of the present disclosure, for improving performance for backward seeks of data. In the present embodiment, the multiple address pointers utilized in the present techniques include a file start address pointer $I_{FS}$ which corresponds to the beginning of multimedia file 408, a current address pointer $I_C$, and a backward seek address pointer $I_{BS}$. In addition, the present techniques may also utilize an index table address pointer $I_i$. In the present embodiment, separate pairs of current and backward seek address pointers are actually utilized for both video and audio (i.e. $I_{Cv}$ and $I_{BSv}$ for video, and $I_{Ca}$ and $I_{BSa}$ for audio) although the description may reference only a single pair to reduce complexity of the discussion for better understanding.

The current address pointer $I_C$ is set to correspond to the current position of play in multimedia file 408, and is utilized primarily for requests via the file system module for typical play (where possible or practical). On the other hand, backward seek address pointer $I_{BS}$ is set to correspond to a backward seek position (i.e. as expected or anticipated) relative the current position of play in multimedia file 408, and is utilized primarily for requests via the file system module for backward seek (where possible or practical). Index table address pointer $I_i$ is set to correspond to the position of the index table (expected or anticipated, or actual) and is utilized primarily for requests via the file system module for accessing the index table of multimedia file 408. If none of the address pointers $I_C$, $I_{BS}$, or $I_i$ are appropriate for use for accessing data, the file start address pointer $I_{FS}$ which corresponds to the beginning of multimedia file 408 is utilized.

Preferably, a file handle duplication API (Application Programming Interface) from the file system module is utilized for the creation and updating of the address pointers. Whenever the current address pointer $I_C$ is updated from a current multimedia request (e.g. from a multimedia request for continuing the playing of video/audio), its corresponding backward seek address pointer $I_{BS}$ is updated as a function of the updated current address pointer $I_C$. On the other hand, file start address pointer $I_{FS}$ and index table address pointer $I_i$ remain fixed and constant after initialization for steady-state processing.

In one embodiment, the index table address pointer $I_i$ is initialized or set at a predetermined fixed percentage P of the file length L of multimedia file 408. This is an estimated, expected, or anticipated location where the index table location will be. The predetermined percentage may be, for example, 99% of the file length, but any suitable range is possible (e.g. a range of 95-99%). Thus, the file length L of multimedia file 408 is obtained by the interface module and a calculation of $I_i=P*L$ is performed for setting the index table address pointer $I_i$. In another embodiment, the index table address pointer $I_C$ is initialized or set based on a location of the index table identified from header information in multimedia file 408. In particular, upon initialization and loading, the interface module identifies an "stsz" box from multimedia file 408 and reads header information from the stsz box for obtaining the location of the index table and setting the index table address pointer $I_i$. The index table address pointer $I_i$ then remains fixed and constant after initialization for steady-state processing associated with multimedia file 408.

Each depiction in FIGS. 6A, 6B, and 6C illustrates the file length L of the multimedia file 408 as well as the current, updated position of each address pointer $I_C$, $I_{BS}$ and $I_i$ relative to the file length at different points in time during play of multimedia file 408. FIG. 6B reveals the pointers being further along than the pointers in FIG. 6A, and FIG. 6C reveals the pointers being further along than the pointers in FIG. 6B.

Figure 7:
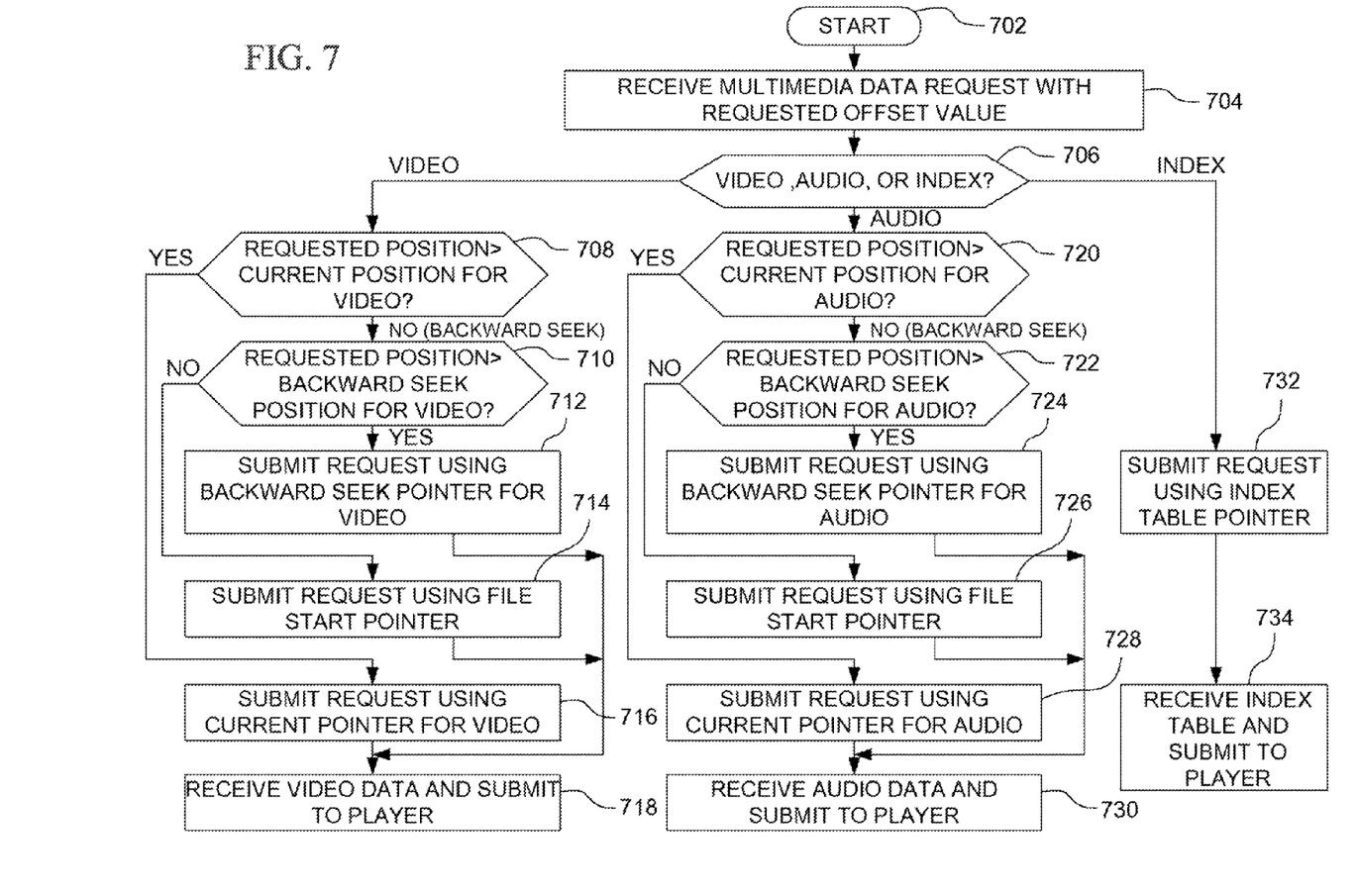
FIG. 7 is a flowchart of a method for use in processing multimedia data requests for multimedia data in a multimedia file with use of the one or more address pointers of the present disclosure.

FIG. 7 is a flowchart of a method for use in processing multimedia data requests for multimedia data in a multimedia file with use of the address pointers as described herein. The method may be employed in a portable electronic device, such as the mobile communication device of FIGS. 1-2, and/or in an interface module (e.g. interface module 404 of FIG. 4) or as a combination of components. The method may be embodied as one or more software processing components including computer instructions stored in memory or other computer readable medium and executable by one or more processors such as a microprocessor or the like. The interface module is adapted to maintain a current address pointer which corresponds to a current position in the multimedia file being played by the multimedia player application, and also maintain a backward seek address pointer which corresponds to a preceding position in the multimedia file between the current position and the beginning of the multimedia file. Current and backward seek address pointers are preferably maintained for both video and audio data. In addition, the interface module is adapted to set and maintain a file start address pointer which corresponds to the beginning of the multimedia file, and an index table address pointer $I_i$ which corresponds to the position of the index table (expected or anticipated, or actual based on the header information).

Beginning at a start block 702 of FIG. 7, the interface module receives a multimedia data request for multimedia data which includes a requested offset value to the requested multimedia data in the multimedia file (step 704 of FIG. 7). The interface module identifies, from the request, whether the request is for video, audio, or the index table data (step 706 of FIG. 7). If the request is for video data, a processing branch to step 708 is performed. If the request is for audio data, a processing branch to step 720 is performed. Finally, if the request is for index table data, a processing branch to step 732 is performed. Processing in relation to FIG. 7 occurs continually for each one of a plurality of consecutive multimedia data requests.

In step 708 (video processing branch), it is tested whether the requested offset value corresponds to a position in the multimedia file that follows (i.e. is greater than) the current position. If so, a corresponding data request for the requested multimedia (video) data is submitted to the file system module which includes the current address pointer for video and an offset value (step 716 of FIG. 7). The requested multimedia (video) data from the file system module is received in response (step 718 of FIG. 7). The backward seek pointer address for video is then updated as a function of the updated current address pointer for video. On the other hand, if the requested offset value corresponds to a position in the multimedia file that precedes the current position as tested in step 708, a backward seek is being requested and the method proceeds to step 710.

In step 710, it is tested whether the requested offset value corresponds to a position that follows (i.e. is greater than) the backward seek position corresponding to the backward seek address pointer for video. If true in step 710, a corresponding data request for the requested multimedia (video) data is submitted to the file system module which includes the backward seek address pointer for video and an offset value (step 712 of FIG. 7). The requested multimedia (video) data from the file system module is received in response (step 718 of FIG. 7). If not true in step 710, however, a corresponding data request for the requested multimedia (video) data is submitted to the file system module which includes a file start address pointer and an offset value (step 714 of FIG. 7). The requested multimedia (video) data from the file system module is received in response (step 718 of FIG. 7). The current pointer address for video is then updated per the backward seek request for video, and the backward seek pointer address for video is updated as a function of this updated current address pointer for video. After step 718, the requested multimedia (video) data is submitted to the multimedia player module in response to the initial request.

In step 720 (audio processing branch), it is tested whether the requested offset value corresponds to a position in the multimedia file that follows (i.e. is greater than) the current position. If so, a corresponding data request for the requested multimedia (audio) data is submitted to the file system module which includes the current address pointer for audio and an offset value (step 728 of FIG. 7). The requested multimedia (audio) data from the file system module is received in response (step 730 of FIG. 7). The backward seek pointer address for video is then updated as a function of the updated current address pointer for video. On the other hand, if the requested offset value corresponds to a position in the multimedia file that precedes the current position as tested in step 720, a backward seek is being requested and the method proceeds to step 722.

In step 722, it is tested whether the requested offset value corresponds to a position that follows (i.e. is greater than) the backward seek position corresponding to the backward seek address pointer for audio. If true in step 722, a corresponding data request for the requested multimedia (audio) data is submitted to the file system module which includes the backward seek address pointer for audio and an offset value (step 724 of FIG. 7). The requested multimedia (audio) data from the file system module is received in response (step 730 of FIG. 7). If not true in step 722, however, a corresponding data request for the requested multimedia (audio) data is submitted to the file system module which includes the file start address pointer and an offset value (step 726 of FIG. 7). The requested multimedia (audio) data from the file system module is received in response (step 730 of FIG. 7). The current pointer address for audio is then updated per the backward seek request for audio, and the backward seek pointer address for audio is updated as a function of this updated current address pointer for audio. After step 730, the requested multimedia (audio) data is submitted to the multimedia player module in response to the initial request.

In step 732 (index table processing branch), a data request for the index table data is submitted to the file system module which includes the index table pointer. The requested index table data from the file system module is received in response (step 734 of FIG. 7). The current and backward seek pointer addresses are updated as needed. After step 734, the requested index table data is submitted to the multimedia player module in response to the initial request.

As described above, each backward seek address pointer is updated as a function of its corresponding updated current address pointer. In general, the intent is to utilize some means to best predict or guess where the anticipated or expected backward seek position might start. The backward seek address pointer may be updated to maintain a fixed length or distance from the current address pointer, or as a percentage of the current address pointer (e.g. 90%, or between a range of 50-95% or any suitable range), as examples. Preferably, the backward seek address pointer is updated based on the following relation;

$$I_{BS} = K^*(I_C - I_{BS}) + I_{BS}$$

where $I_{BS}$ is the backward seek address pointer, $I_C$ is the current address pointer, and K is a constant value. Most preferably, the backward seek address pointer is updated based on the following relation:

$$I_{BS} = \Phi^*(I_C - I_{BS}) + I_{BS}$$

where $I_{BS}$ is the backward seek address pointer, $I_C$ is the current address pointer, and $\Phi$=the "golden ratio" or $((1 \pm \sqrt{5})/2)$. The golden ratio (sometimes referred to as the "golden proportion value" in mathematics) may be rounded to 0.618, or even 0.62 or 0.6 if deemed appropriate, for example.

In a further more detailed embodiment, the address pointers are updated as follows. For the case where the requested position R is greater than the position corresponding to the current address index $I_C$, or then the requested data is read with use of $I_C$, and $I_C$ is moved forward to 90% of R if IC<90% of R. For the case where the requested position R is less than the position corresponding to Ic, and greater than the position corresponding to $I_{BS}$, or then the requested data is read with use of $I_{BS}$, and $I_{BS}$ is moved to 0.618 of $(I_C - I_{BS})$. For the case where the requested position R is less than the position corresponding to $I_C$, or then $I_{BS}$ is moved to the requested position (from the file start), and then the requested data is read with use of $I_{BS}$. Other suitable predetermined percentages and constants may be utilized as alternatives as well.

Thus, methods and apparatus for improving backward seek performance for multimedia files have been described. In one illustrative embodiment, a multimedia player application is adapted to process multimedia data of one or more multimedia files to produce multimedia output data at an audio/video output device. Each multimedia file is fragmented into a plurality of non-contiguous data blocks in memory. A file allocation table system is adapted to manage storage of these multimedia and maintain a file allocation table with address entries for listing the sequential order of the data blocks of the multimedia files. An interface process is adapted to maintain a current address pointer which corresponds to a current position in the multimedia file being played by the multimedia player application, and also maintain a backward seek address pointer which corresponds to a preceding position in the multimedia file between the current position and the beginning of the multimedia file. For each one of a plurality of multimedia data requests for multimedia data from the multimedia player application, the interface process is further adapted to receive a multimedia data request for multimedia data which includes a requested offset value to the requested multimedia data in the multimedia file; if the requested offset value corresponds to a position in the multimedia file that follows the current position: submit, to the file system, a corresponding data request for the requested multimedia data which includes the current address pointer and an offset value, and receiving the requested multimedia data from the file system in response; if the requested offset value corresponds to a position in the multimedia file that precedes the current position: submit, to the file system, a corresponding data request for the requested multimedia data which includes the backward seek address pointer and an offset value, and receiving the requested multimedia data from the file system in response; and submit the requested multimedia data to the multimedia player module in response to the multimedia data request. Advantageously, backward seek times for backward seeks in the multimedia files are reduced.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in processing multimedia data requests for multimedia data in a multimedia file which is managed by a file system employing a singly linked list of address entries indicating a sequential order of data blocks of the multimedia file, wherein the file system is configured to find a correct position of requested multimedia data by searching through the singly linked list of address entries beginning at an address, the method comprising the acts of:
  maintaining storage of a current address pointer which corresponds to a current position in the multimedia file;
  maintaining storage of a backward seek address pointer which corresponds to a preceding position in the multimedia file between the current position and the beginning of the multimedia file;
  receiving a multimedia data request for multimedia data which includes a requested offset value to the requested multimedia data in the multimedia file;
  if the requested offset value corresponds to a position in the multimedia file that follows the current position associated with the current address pointer, then submitting to the file system a corresponding data request for the requested multimedia data which includes the current address pointer as the address and an offset value;
  if the requested offset value corresponds to a position in the multimedia file that precedes the current position associated with the current address pointer, then submitting to the file system a corresponding data request for the requested multimedia data which includes the backward seek address pointer as the address and an offset value;
  updating the current address pointer to thereby produce an updated current address pointer;
  updating the backward seek address pointer to thereby produce an updated backward seek address pointer, by calculating the updated backward seek address pointer as a function of the difference between the updated current address pointer and the backward seek address pointer; and
  repeating the acts of receiving, submitting, and updating the current and the backward seek address pointers for additional multimedia data requests.

2. The method of claim 1, wherein the act of receiving the multimedia data request comprises the further act of receiving the multimedia data request from a multimedia player module, the method comprising the further acts of:
  receiving the requested multimedia data from the file system in response the corresponding data request for the requested multimedia data; and
  submitting the requested multimedia data to the multimedia player module in response to the multimedia data request.

3. The method of claim 1, further comprising:
  maintaining storage of a file start address pointer which corresponds to the beginning of the multimedia file; and
  if the requested offset value corresponds to a position in the multimedia file that precedes the preceding position associated with the backward seek address pointer, then submitting to the file system a corresponding data request for the requested multimedia data which includes the file start address pointer as the address and an offset value, and receiving the requested multimedia data from the file system in response.

4. The method of claim 1, further comprising:
  maintaining storage of an index table address pointer for an index table in the multimedia file; and
  if the multimedia data request is for the index table, then submitting to the file system a corresponding data request for the multimedia data which includes the index table address pointer as the address, and receiving the multimedia data from the file system in response.

5. The method of claim 1, further comprising:
  identifying, from header information of the multimedia file, a location of an index table of the multimedia file;
  setting an index table address pointer based on the identified location of the index table; and
  if the multimedia data request is for the index table, then submitting to the file system a corresponding data request for the multimedia data which includes the index table address pointer as the address and receiving the multimedia data from the file system in response.

6. The method of claim 1, wherein the current address pointer comprises a current video data address pointer which corresponds to a current video data position in the multimedia file, the backward seek address pointer comprises a backward seek video data address pointer which corresponds to a preceding video data position in the multimedia file between the current video data address position and the beginning of the multimedia file, and the multimedia data request comprises a video data request for video data in the multimedia file, the method comprising the further acts of:

maintaining storage of a current audio data address pointer which corresponds to a current audio data position in the multimedia file;

maintaining storage of a backward seek audio data address pointer which corresponds to a preceding audio data position in the multimedia file between the current audio data position and the beginning of the multimedia file;

receiving an audio data request for audio data which includes a requested offset value to requested audio data in the multimedia file;

if the requested offset value corresponds to a position in the multimedia file that follows the current audio data position associated with the current audio data address pointer, then submitting to the file system a corresponding audio data request for the requested audio data which includes the current audio data address pointer as the address and an offset value, and receiving the requested audio data from the file system in response;

if the requested offset value corresponds to a position in the multimedia file that precedes the current audio data position associated with the current audio data address pointer, then submitting to the file system a corresponding audio data request for the requested audio data which includes the backward seek audio data address pointer as the address and an offset value, and receiving the requested audio data from the file system in response;

updating the current audio data address pointer to thereby produce an updated current audio data address pointer;

updating the backward seek audio data address pointer to thereby produce an updated backward seek audio data address pointer, by calculating the updated backward seek audio data address pointer as a function of the difference between the updated current audio data address pointer and the backward seek audio data address pointer; and repeating the acts of receiving, submitting, and updating the current and the backward seek audio data address pointers for additional multimedia data requests.

7. The method of claim 1, wherein the multimedia file is fragmented into a plurality of non-contiguous data blocks in memory and managed by the file system comprising a file allocation table (FAT).

8. The method of claim 1, wherein the act of submitting is performed for each one of a plurality of multimedia data requests for multimedia data from a multimedia player module.

9. The method of claim 1, wherein the act of updating the backward seek address pointer further comprises:

calculating the updated backward seek address pointer based on the following relation:

updated $I_{BS}=K*(\text{updated } I_C - I_{BS})+I_{BS}$ where
$I_{BS}$ is the backward seek address pointer;
$I_C$ is the current address pointer; and
K is a constant value.

10. The method of claim 1, wherein the act of updating the backward seek address pointer further comprises:

calculating the updated backward seek address pointer based on the following relation:

updated $I_{BS}=\Phi*(\text{updated } I_C - I_{BS})+I_{BS}$ where
$I_{BS}$ is the backward seek address pointer;
$I_C$ is the current address pointer; and
$\Phi$=the golden ratio that is equal to $((1\pm\sqrt{5})/2)$.

11. The method of claim 1, wherein the act of updating the backward seek address pointer maintains a fixed length between the backward seek address pointer and the current address pointer.

12. The method of claim 1, wherein the multimedia file is formatted in accordance with an MPEG-4 version format or other compatible version format.

13. The method of claim 1, which is embodied in a computer program product comprising a computer readable medium and computer instructions stored in the computer readable medium, where the computer instructions are executable by one or more processors for performing the method.

14. A portable electronic device, comprising:

one or more processors;

memory coupled to the one or more processors;

an audio/video output device coupled to the one or more processors;

the memory for storing one or more multimedia files;

a file system which is executable by the one or more processors and configured to manage storage of the multimedia files in the memory;

the file system being further configured to employ a singly linked list of address entries indicating a sequential order of data blocks of the multimedia files, and to find a correct position of requested multimedia data by searching through the singly linked list of address entries beginning at an address;

a multimedia player application which is executable by the one or more processors, the multimedia player application being configured to process multimedia data of the multimedia files to produce multimedia output data at the audio/video output device;

an interface process which is executable by the one or more processors for interfacing between the multimedia player module and the file system, the interface process being configured to:

maintain storage of a current address pointer which corresponds to a current position in the multimedia file;

maintain storage of a backward seek address pointer which corresponds to a preceding position in the multimedia file between the current position and the beginning of the multimedia file;

for each one of a plurality of multimedia data requests for multimedia data from the multimedia player application:

receive, from the multimedia player application, a multimedia data request for multimedia data which includes a requested offset value to the requested multimedia data in the multimedia file;

if the requested offset value corresponds to a position in the multimedia file that follows the current position associated with the current address pointer, then submit to the file system a corresponding data request for the requested multimedia data which includes the current address pointer as the address and an offset value;

if the requested offset value corresponds to a position in the multimedia file that precedes the current position associated with the current address pointer, then submit to the file system a corresponding data request for the requested multimedia data which includes the backward seek address pointer as the address and an offset value update the current address pointer to thereby produce an updated current address pointer; and update the backward seek address pointer to thereby produce an updated backward seek address pointer, by calculating the updated backward seek address pointer as a function of the difference between the updated current address pointer and the backward seek address pointer.

15. The portable electronic device of claim 14, wherein the interface process is further configured to:
maintain storage of a file start address pointer which corresponds to the beginning of the multimedia file; and
if the requested offset value corresponds to a position in the multimedia file that precedes the preceding position associated with the backward seek address pointer, then submit to the file system a corresponding data request for the requested multimedia data which includes the file start address pointer as the address and an offset value, and receive the requested multimedia data from the file system in response.

16. The portable electronic device of claim 14, wherein the interface process is further configured to:
maintain storage of an index table address pointer for an index table in the multimedia file; and
if the multimedia data request is for the index table, then submit to the file system a corresponding data request for the multimedia data which includes the index table address pointer as the address, and receive the multimedia data from the file system in response.

17. The portable electronic device of claim 14, wherein each multimedia file is fragmented into a plurality of non-contiguous data blocks, and the file system is configured to manage storage of the multimedia files in the memory and comprising a file allocation table (FAT).

18. The portable electronic device of claim 14, wherein the current address pointer comprises a current video data address pointer which corresponds to a current video data position in the multimedia file, the backward seek address pointer comprises a backward seek video data address pointer which corresponds to a preceding video data position in the multimedia file between the current video data address position and the beginning of the multimedia file, and the multimedia data request comprises a video data request for video data in the multimedia file, the interface process being further configured to:
maintain storage of a current audio data address pointer which corresponds to a current audio data position in the multimedia file;
maintain storage of a backward seek audio data address pointer which corresponds to a preceding audio data position in the multimedia file between the current audio data position and the beginning of the multimedia file;
receive an audio data request for audio data which includes a requested offset value to requested audio data in the multimedia file;
if the requested offset value corresponds to a position in the multimedia file that follows the current audio data position associated with the current audio data address pointer, then submit to the file system to the file system, a corresponding audio data request for the requested audio data which includes the current audio data address pointer as the address and an offset value, and receive the requested audio data from the file system in response;
if the requested offset value corresponds to a position in the multimedia file that precedes the current audio data position associated with the current audio data address pointer, then submit to the file system a corresponding audio data request for the requested audio data which includes the backward seek audio data address pointer as the address and an offset value, and receive the requested audio data from the file system in response;
update the current audio data address pointer to thereby produce an updated current audio data address pointer; and
update the backward seek audio data address pointer to thereby produce an updated backward seek audio data address pointer, by calculating the updated backward seek audio data address pointer as a function of the difference between the updated current audio data address pointer and the backward seek audio data address pointer.

19. The portable electronic device of claim 14 wherein the interface process is further configured to submit for each one of the plurality of multimedia data requests for multimedia data from a multimedia player module.

20. The portable electronic device of claim 14, wherein the interface process is further configured to:
calculate the updated backward seek address pointer based on the following relation:

$$\text{updated } I_{BS} = K^*(\text{updated } I_C - I_{BS}) + I_{BS}$$

where
$I_{BS}$ is the backward seek address pointer;
$I_C$ is the current address pointer; and
K is a constant value.

21. The portable electronic device of claim 14, wherein the interface process is further configured to:
calculate the backward seek address pointer based on the following relation:

$$\text{updated } I_{BS} = \Phi^*(\text{updated } I_C - I_{BS}) + I_{BS}$$

where
$I_{BS}$ is the backward seek address pointer;
$I_C$ is the current address pointer; and
$\Phi$=the golden ratio that is equal to $((1\pm\sqrt{5})/2)$.

22. An interface module configured in a processor of an electronic device and configured to interface between a multimedia player module and a file system, the interface module being configured for use in processing multimedia data requests for multimedia data in a multimedia file which is managed by the file system employing a singly linked list of address entries indicating a sequential order of data blocks of the multimedia file, wherein the file system is configured to find a correct position of requested multimedia data by searching through the singly linked list of address entries beginning at an address, the interface module being further configured to:
maintain storage of a current address pointer which corresponds to a current position in the multimedia file;
maintain storage of and regularly update a backward seek address pointer which corresponds to a preceding position in the multimedia file between the current position and the beginning of the multimedia file;
for each one of a plurality of multimedia data requests for multimedia data from the multimedia player application:
receive, from the multimedia player module, a multimedia data request for multimedia data which includes a requested offset value to the requested multimedia data in the multimedia file;
if the requested offset value corresponds to a position in the multimedia file that follows the current position associated with the current address pointer, then submit to the file system a corresponding data request for the requested multimedia data which includes the current address pointer as the address and an offset value;

if the requested offset value corresponds to a position in the multimedia file that precedes the current position associated with the current address pointer, then submit to the file system a corresponding data request for the requested multimedia data which includes the backward seek address pointer as the address and an offset value;

submit the requested multimedia data to the multimedia player module in response to the multimedia data request;

update the current address pointer to thereby produce an updated current address pointer; and update the backward seek address pointer to thereby produce an updated backward seek address pointer, by calculating the updated backward seek address pointer as a function of the difference between the updated current address pointer and the backward seek address Pointer.

23. The interface module of claim 22, which is further configured to maintain an index table address pointer for an index table in the multimedia file and, if the multimedia data request is for the index table, then submit to the file system a corresponding data request for the multimedia data which includes the index table address pointer as the address, and receiving the multimedia data from the file system in response.

24. The interface module of claim 22, wherein the file system comprises a file allocation table (FAT) system and the multimedia file comprises a MPEG-4 file.

25. The interface module of claim 22, wherein the interface module is further configured to update the backward seek address pointer by:

calculating the updated backward seek address pointer based on the following relation:

$$\text{updated } I_{BS} = K*(\text{updated } I_C - I_{BS}) + I_{BS}$$

where
$I_{BS}$ is the backward seek address pointer;
$I_C$ is the current address pointer; and
K is a constant value.

26. A method for processing multimedia data requests for multimedia data in a MPEG-4 file which is managed by a file allocation table (FAT) system employing a singly linked list of address entries indicating a sequential order of data blocks of the MPEG-4 file, wherein the single-link FAT system is configured to find a correct position of requested multimedia data by searching through the singly linked list of address entries beginning at an address, the interface module having a current address pointer corresponding to a current position in the MPEG-4 file and a backward seek address pointer corresponding to a preceding position in the MPEG-4 file between the current position and the beginning of the MPEG-4 file, the method comprising:

for each one of a plurality of multimedia data requests for multimedia data from a multimedia player application:
receiving a multimedia data request for multimedia data which includes a requested offset value to the requested multimedia data in the MPEG-4 file managed by the single-link FAT system;

if the requested offset value corresponds to a position in the MPEG-4 file that follows the current position associated with the current address pointer, then submitting to the single-link FAT system a corresponding data request for the requested multimedia data which includes the current address pointer as the address and an offset value;

if the requested offset value corresponds to a position in the MPEG-4 file that precedes the current position associated with the current address pointer, then submitting to the single-link FAT system a corresponding data request for the requested multimedia data which includes the backward seek address pointer as the address and an offset value;

updating the current address pointer to thereby produce an updated current address pointer; and updating the backwards seek address pointer to thereby produce an updated backwards seek address pointer, by calculating the updated backward seek address pointer as a function of the difference between the updated current address pointer and the backward seek address pointer.

27. The method of claim 26, wherein the method is for use in a portable communication device.

28. The method of claim 26, wherein the method is for use in a mobile communication device operative in a wireless communication network.

29. The method of claim 26, wherein the act of updating the backward seek address pointer further comprises:

calculating the updated backward seek address pointer based on the following relation:

$$\text{updated } I_{BS} = K*(\text{updated } I_C - I_{BS}) + I_{BS}$$

where
$I_{BS}$ is the backward seek address pointer;
$I_C$ is the current address pointer; and
K is a constant value.

30. The method of claim 26, wherein the act of updating the backward seek address pointer further comprises:

calculating the updated backward seek address pointer based on the following relation:

$$\text{updated } I_{BS} = \Phi*(\text{updated } I_C - I_{BS}) + I_{BS}$$

where
$I_{BS}$ is the backward seek address pointer;
$I_C$ is the current address pointer; and
$\Phi$ = the golden ratio that is equal to $((1\pm\sqrt{5})/2)$.

31. The interface module of claim 22, wherein the interface module is further configured to update the backward seek address pointer by:

calculating the updated backward seek address pointer based on the following relation:

$$\text{updated } I_{BS} = \Phi*(\text{updated } I_C - I_{BS}) + I_{BS}$$

where
$I_{BS}$ is the backward seek address pointer;
$I_C$ is the current address pointer; and
$\Phi$ = the golden ratio that is equal to $((1\pm\sqrt{5})/2)$.

* * * * *